June 4, 1935.  F. A. BRANDSTROM  2,003,424
AUTOMATIC PHONOGRAPH
Filed Feb. 1, 1932  9 Sheets-Sheet 2
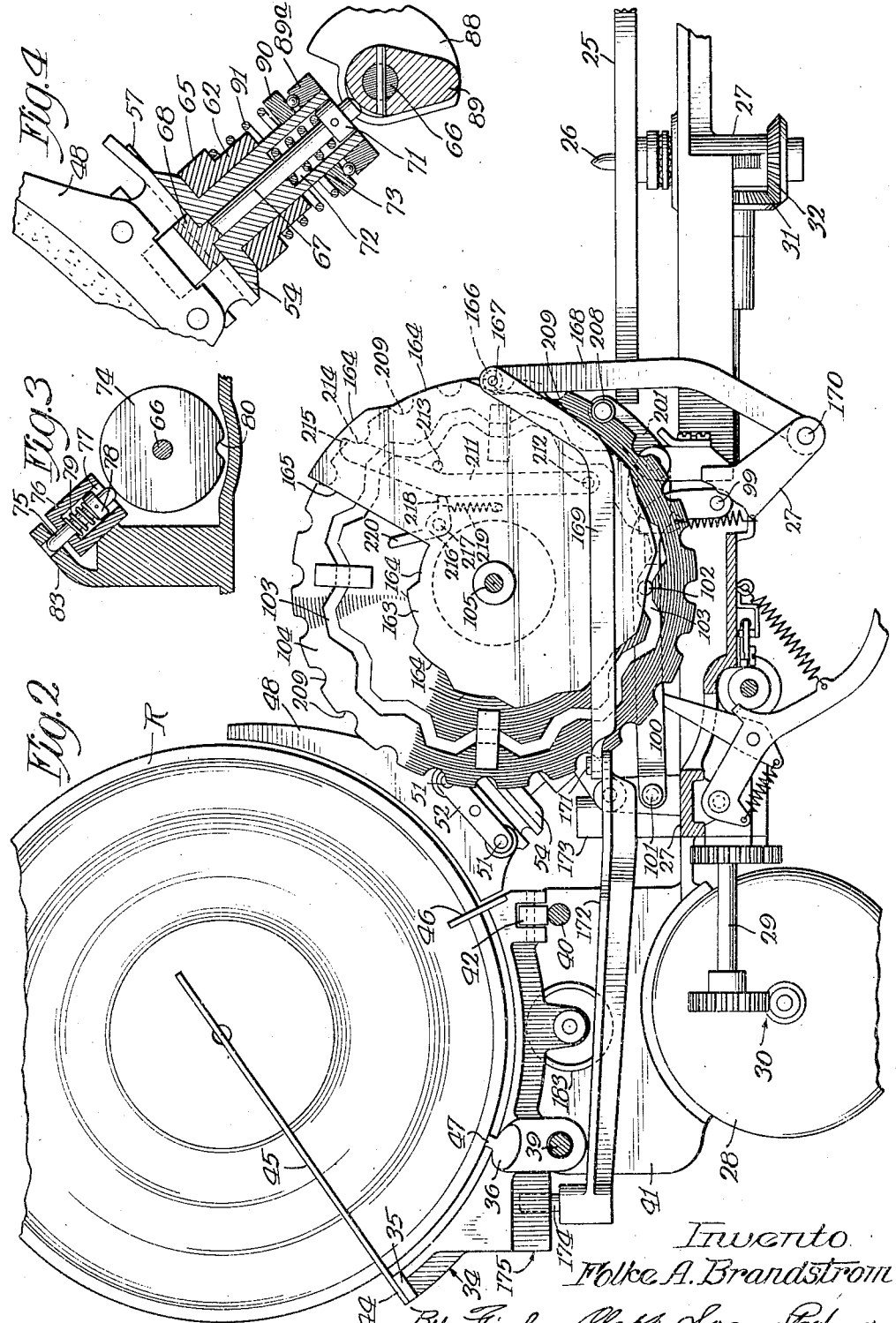
Inventor
Folke A. Brandstrom
By Fisher, Clapp, Soans & Pond Attys.

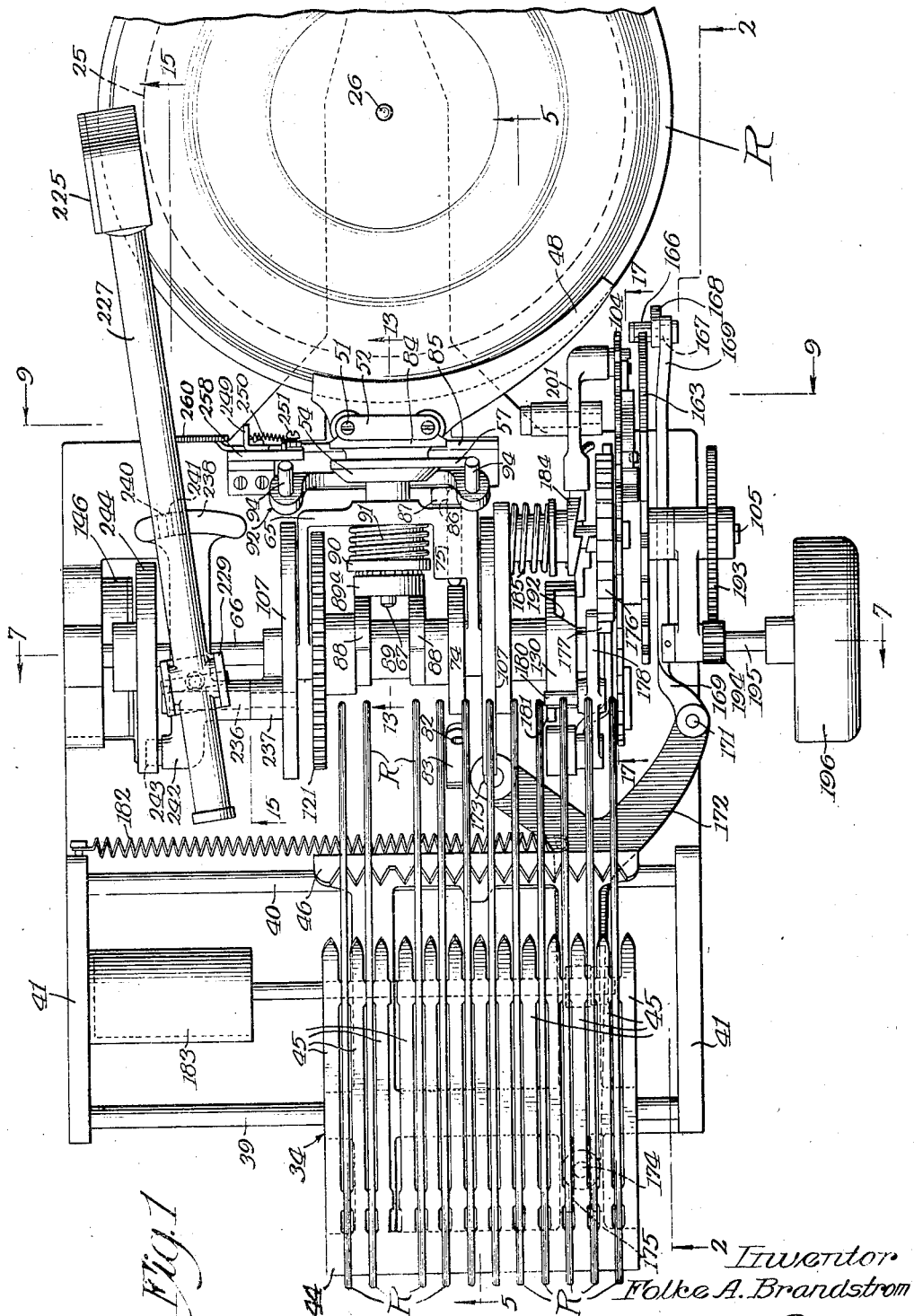

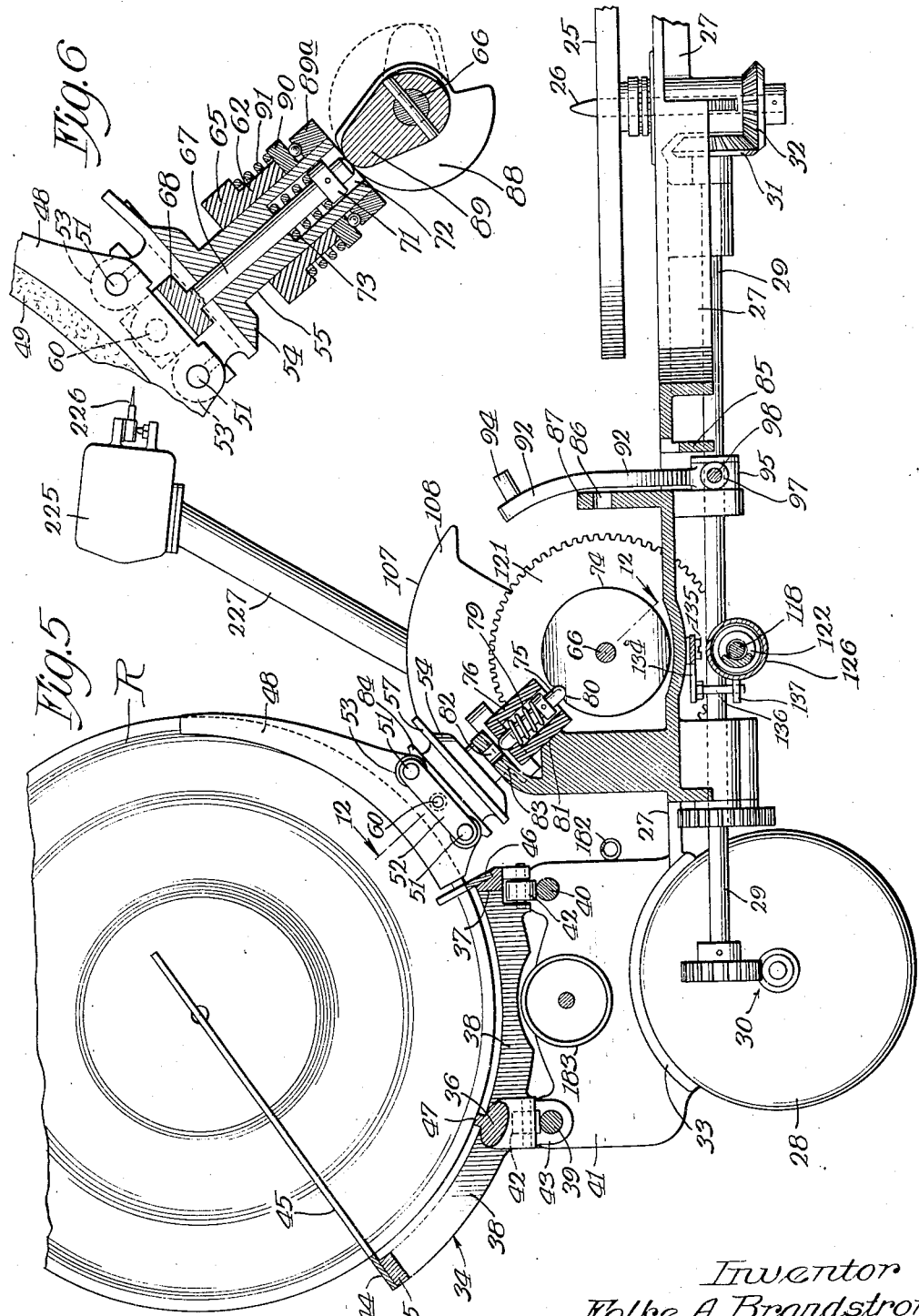

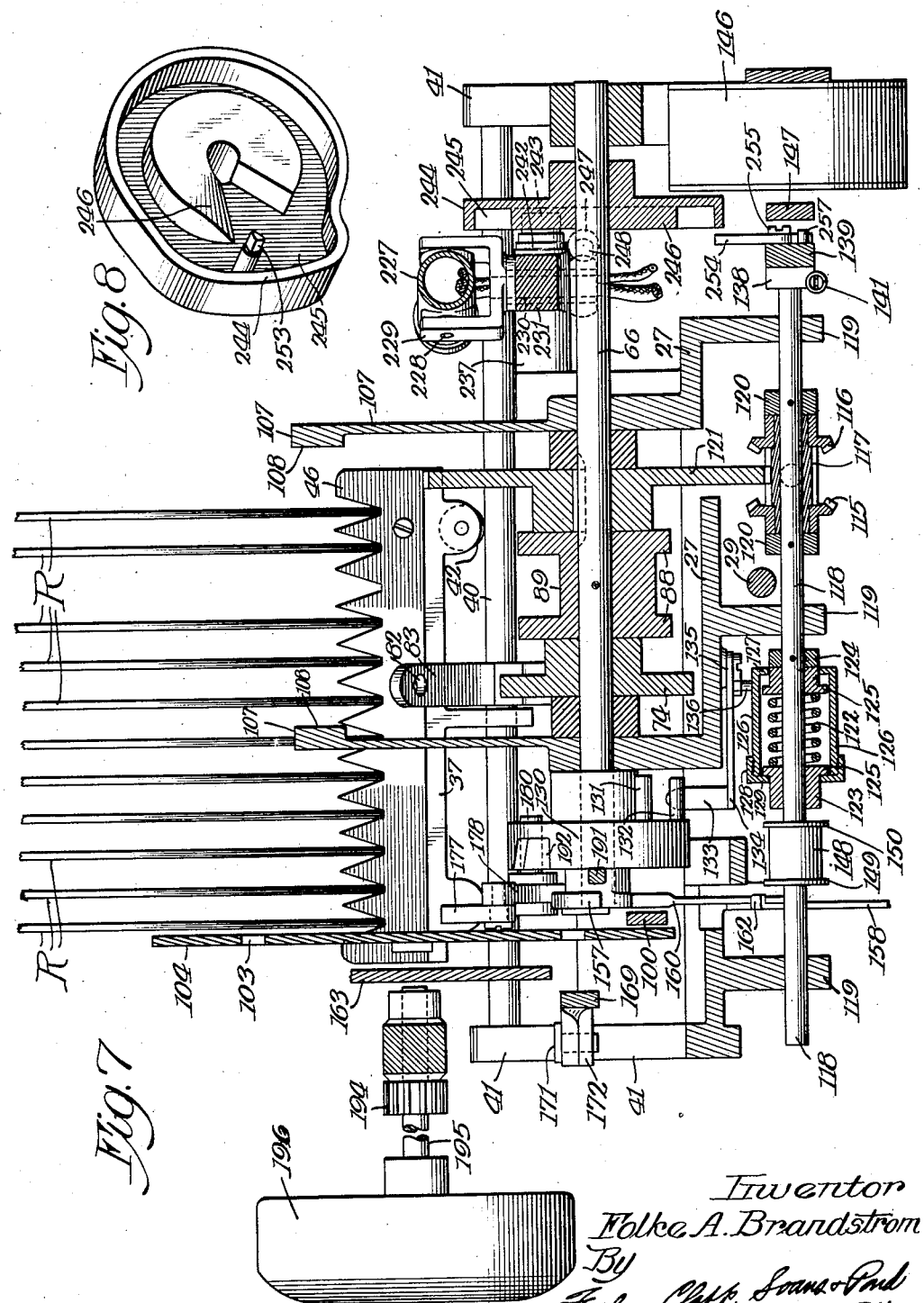

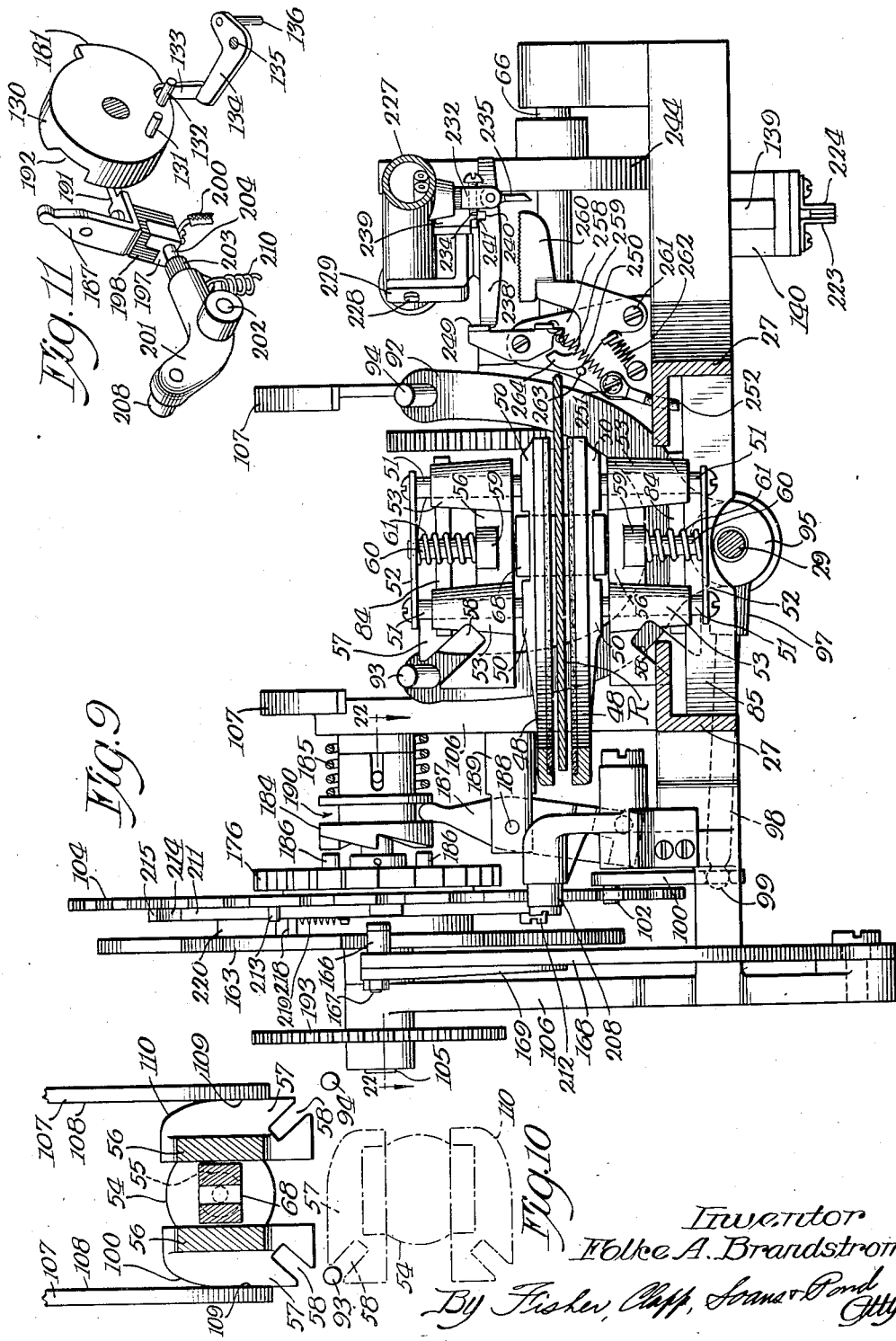

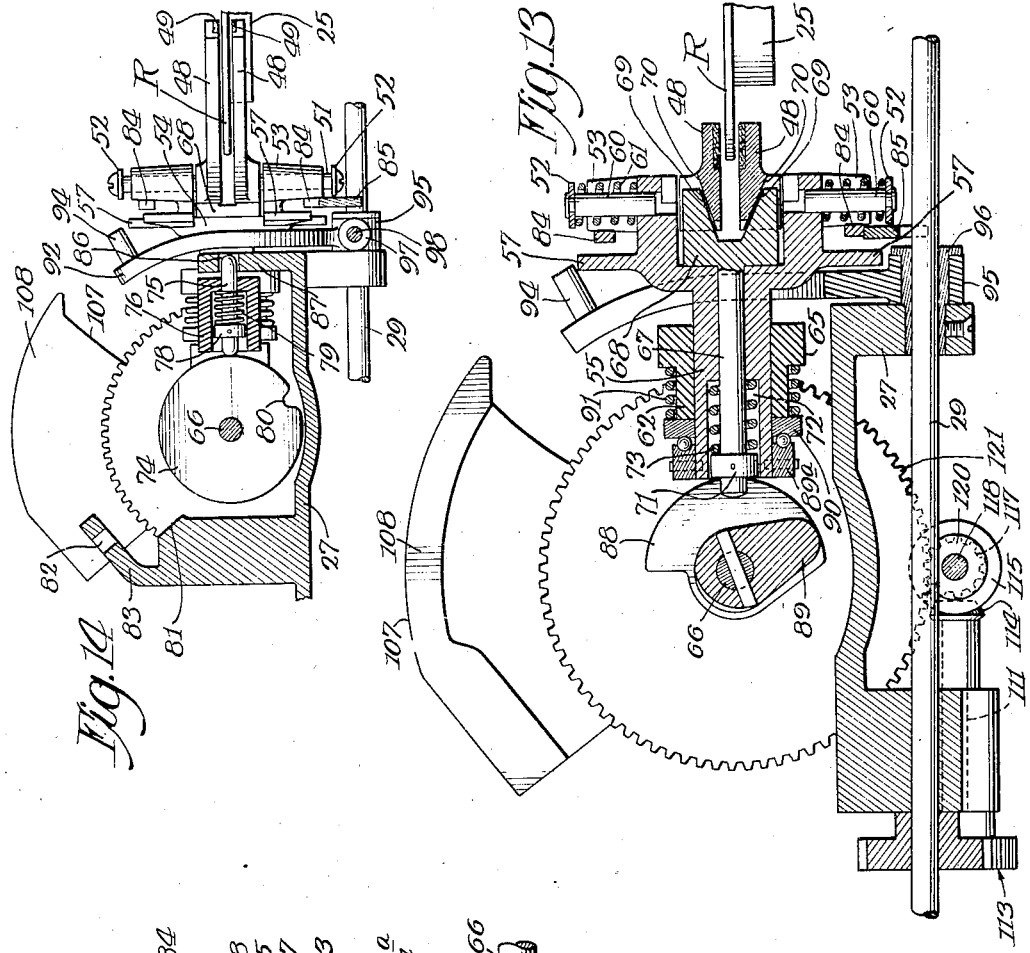
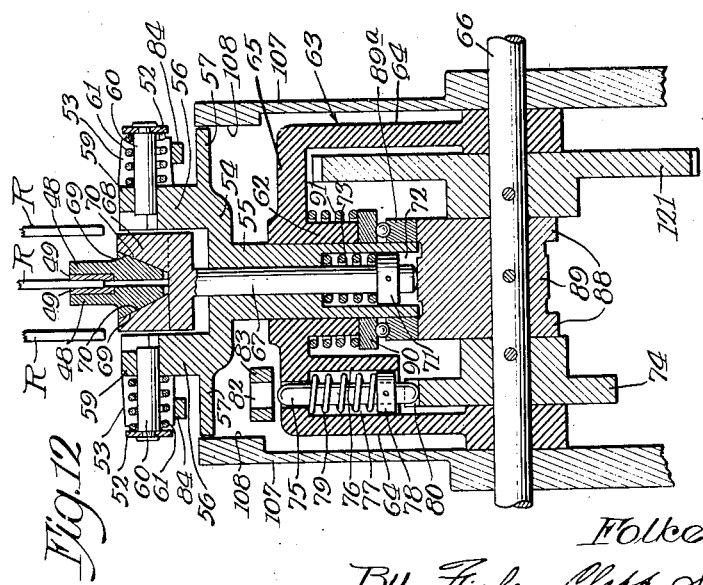

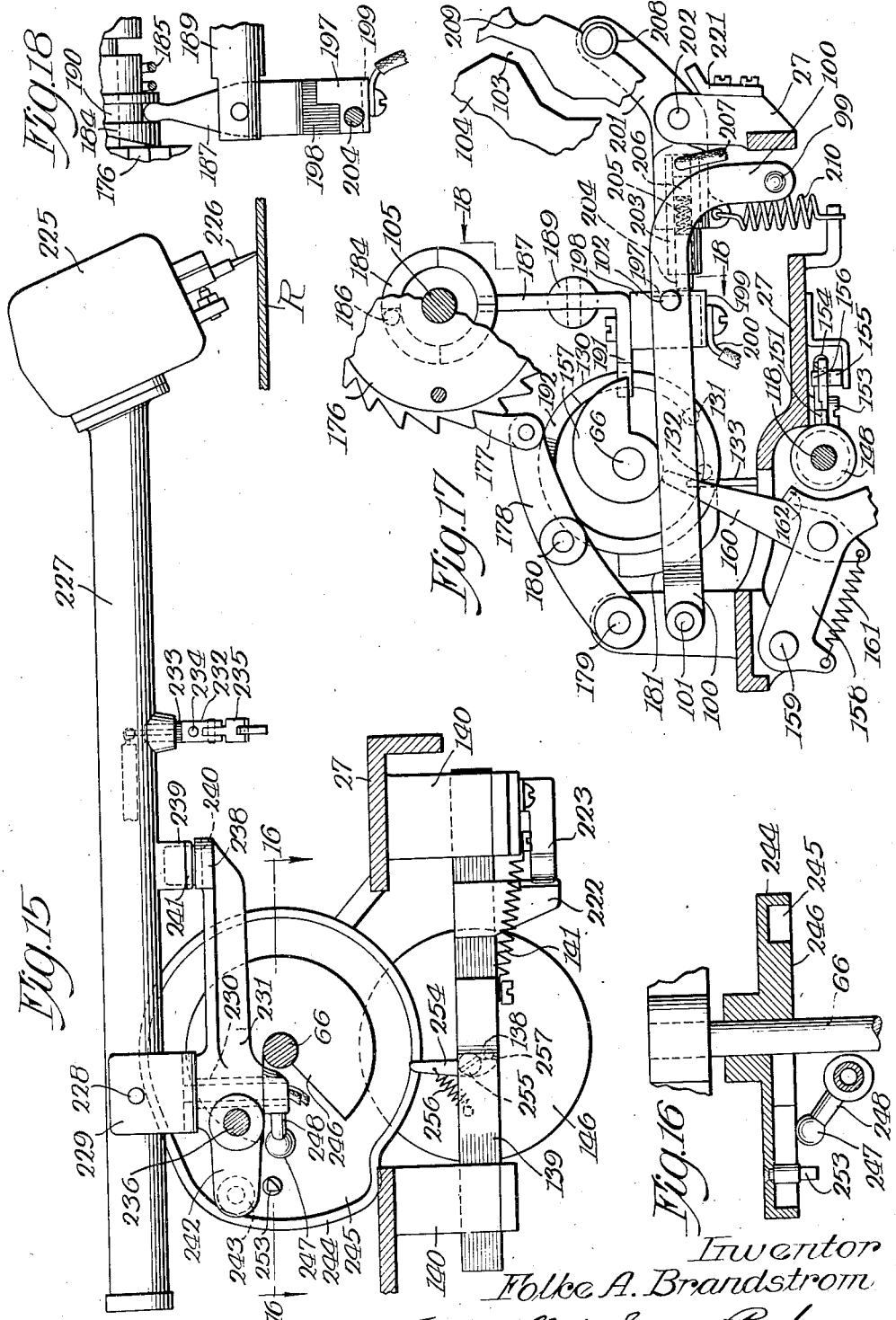

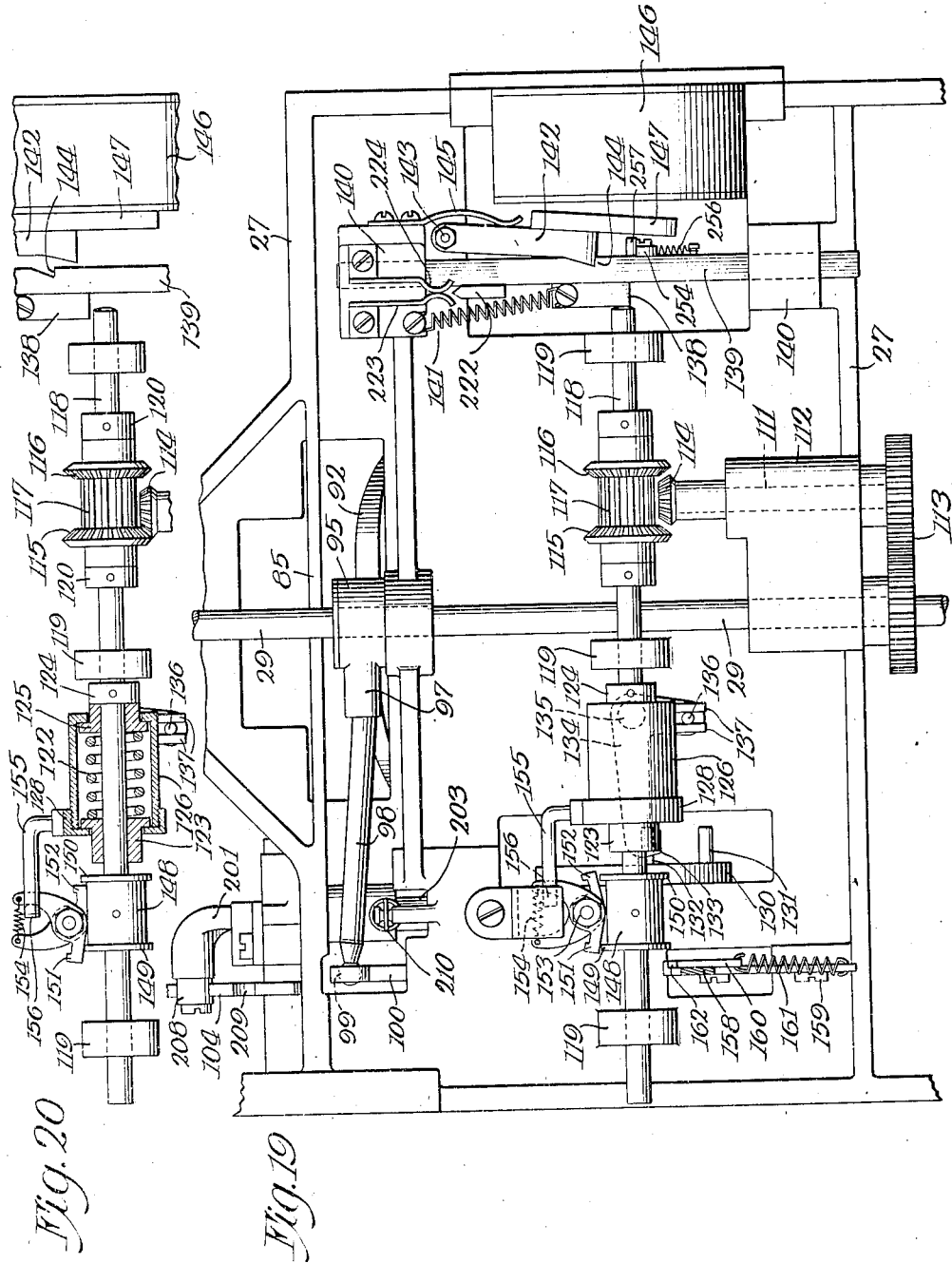

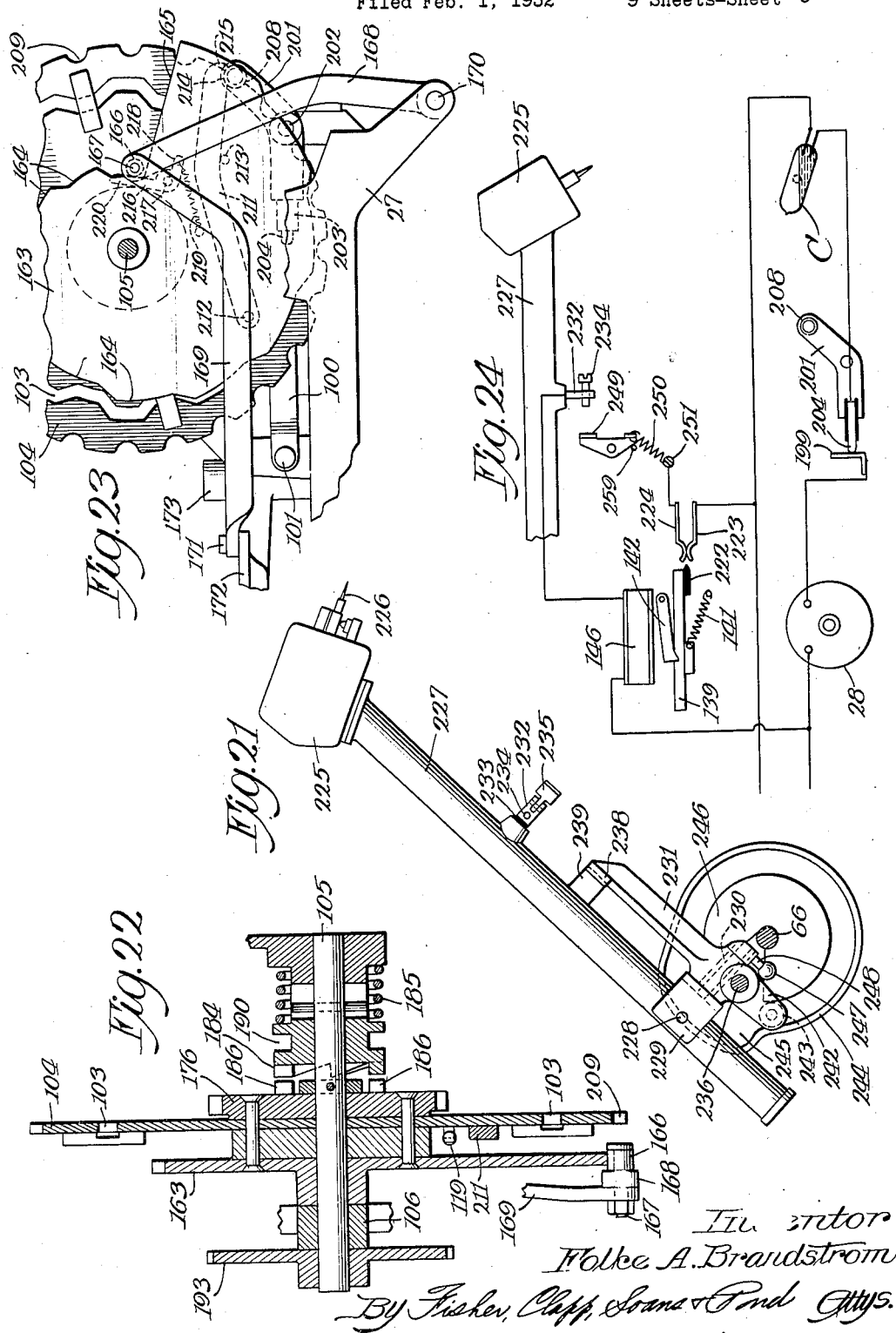

Patented June 4, 1935

2,003,424

UNITED STATES PATENT OFFICE 2,003,424

AUTOMATIC PHONOGRAPH

Folke A. Brandstrom, Chicago, Ill., assignor to The John Gabel Mfg. Co., Chicago, Ill., a corporation of Illinois Application February 1, 1932, Serial No. 590,047

14 Claims. (Cl. 274—10)

This invention relates to automatic phonographs, and more particularly to phonographs in which there is a magazine for holding a plurality of records, a turntable, and means for selectively or successively transferring the records from the magazine to the turntable, and from the turntable to the magazine.

The main objects of the invention are to provide an automatic phonograph of the class described in which the record transferring means is operable to turn the record in placing it on the turntable so that both sides of a double-faced record may be played; to provide an arrangement whereby any record and either side of any record may be selected for playing, and to provide a comparatively simple and compact automatic phonograph of the class described. In general, it is the object of the invention to provide an improved automatic phonograph of the class described.

Other objects and advantages of the invention will be understood by reference to the following specification and accompanying drawings (9 sheets), in which an automatic phonograph embodying a selected form of the invention is illustrated.

In the drawings:—

Fig. 1 is a plan.

Fig. 2 is a section on the line 2—2 of Fig. 1.

Figs. 3 and 4 are sectional views illustrating details of mechanism relating to the record transferring means.

Fig. 5 is a section on the line 5—5 of Fig. 1, some parts being shown in a changed position.

Fig. 6 is a detailed section similar to Fig. 4 but showing a changed position of certain parts.

Fig. 7 is a section on the line 7—7 of Fig. 1.

Fig. 8 is a perspective of a cam element for controlling the sound box or the pick-up element.

Fig. 9 is a section on the line 9—9 of Fig. 1.

Fig. 10 is a diagrammatic illustration of the operation of the means for turning the records from vertical to horizontal position.

Fig. 11 is a perspective illustrating the operative relation of certain elements for controlling the operation of the phonograph.

Fig. 12 is a section on the line 12—12 of Fig. 5.

Fig. 13 is a section on the line 13—13 of Fig. 1.

Fig. 14 is a sectional view corresponding to a portion of Fig. 5 but showing certain of the parts in a changed position.

Fig. 15 is a section on the line 15—15 of Fig. 1.

Fig. 16 is a section on the line 16—16 of Fig. 15.

Fig. 17 is a section on the line 17—17 of Fig. 1.

Fig. 18 is a section on the line 18—18 of Fig. 17.

Fig. 19 is a bottom plan of a portion of the phonograph.

Fig. 20 is a view similar to Fig 19, but showing certain parts in a changed position.

Fig. 21 is a view similar to Fig. 15 but showing the parts in a changed position.

Fig. 22 is a section on the line 2—2 of Fig. 9.

Fig. 23 is a view similar to a portion of Fig. 2, but showing certain parts in changed position, and Fig. 24 is a diagram of the electrical circuits employed in the operation of the machine.

Referring now to the drawings, a turntable is indicated at 25, this turntable being mounted on a spindle 26 for rotation therewith, the spindle being preferably inclined slightly to the vertical so that the plane of the turntable and a record thereon slants downwardly slightly from the side on which the pick-up initially engages the record. The spindle 26 is suitably journaled in a frame, which is designated 27. The spindle and turntable are rotated by means of a suitable motor, for example, an electric motor 28 which drives a shaft 29 through a suitable worm and worm wheel connection indicated at 30. The shaft 29 is rotatably mounted in suitable bearing elements which are attached to or formed integral with the frame 27, and the shaft 29 is provided with a bevel gear 31 (see Fig. 5) which meshes with a similar gear 32 secured to the spindle 26. Rotation of the shaft of the motor is thus transferred to the turntable 25 through the longitudinally extending shaft 29. The motor 28 may be supported in any suitable manner, for example by being attached to a bracket portion 33 of the rear end of the frame 27.

*The record magazine*

At the rear end of the phonograph, a record magazine 34 is provided. This magazine includes a series of transversely extending bars 35, 36 and 37 which are connected together by webs 38. The bars 35, 36 and 37 and the connecting webs 38 may be formed integrally of cast metal if desired. Bars 36 and 37 are respectively provided with rollers 42 for engaging supporting rods 39 and 40. These supporting rods extend transversely of the machine between opposite side bracket elements 41—41 which are preferably formed integral with the frame as will be readily understood from an inspection of Figs. 2, 5 and 7. The bar 36 is also provided with depending eyes 43 which receive the supporting rod 39 so as to prevent removal of the magazine from the phonograph. The front portion of the magazine is similarly anchored to the rod 40.

For positioning the records, a plate 44 is secured to the bar 35, this plate being notched or slotted as clearly shown in Fig. 1 to form a series of prongs 45 which serve to receive records between them and to maintain such records in horizontally spaced relation. The front bar 37 is also provided with a plate 46 which is provided with a series of substantially V-shaped notches which are complementary to the pockets between the prongs 45 and serve to cooperate therewith to position the records R in edgewise, vertical position. The bar 36 is provided with an upwardly extending rib 47 which serves to support some of the weight of the records in cooperation with the notched plates 44 and 46.

*The record transferring mechanism*

The record transferring mechanism includes a pair of jaws 48—48 which are of elongated arcuate form and adapted to clamp between them, a marginal portion of a record as is clearly shown in Figs. 5 and 12. The jaws 48 may be conveniently provided with a felt or like lining 49 for preventing injury to the engaged portions of the records.

Each jaw 48 is formed with a pair of relatively spaced bosses 50, in which laterally extending pins 51 are fixedly mounted. The free ends of the pins 51 are connected by a strap 52 (see Fig. 9).

The pins 51 of the jaws are slidably received in suitably apertured bosses 53 which are formed integral with a jaw mounting element 54 (see Fig. 12). The jaw mounting 54 includes a cylindrical stem portion 55 and a head portion including relatively spaced arm portions 56—56 with which the bosses 53 are integrally formed. The head portion of the jaw mounting also includes opposite side flange elements 57, each of which is provided with an angularly disposed notch 58 in its front outer corner (Figs. 9 and 10).

The arm portions 56—56 of the jaw mount are respectively provided with suitably apertured bosses 59 which slidably receive pins 60—60 which are secured to the strap or cross plate 52. Springs 61 are disposed around the pins 60 between the respective cross plates 52 and bosses 59, and serve to normally urge the record gripping jaws 48 to move outwardly, that is to say, to separate from each other.

The cylindrical stem portion 55 of the jaw mount is rotatably and axially, slidably mounted in a suitably apertured boss 62 which is formed integral with a jaw carrier 63. The carrier 63 is of inverted, substantially U-shaped form and includes side arm portions 64—64 which are joined by a cross bar 65. The side arm portions of the carrier are suitably apertured to rotatably fit on a cam shaft 66 so that the jaw carrier 63 and the parts mounted thereon may be swung or pivoted around the axis of the cam shaft 66.

The cylindrical stem portion 55 of the jaw mount is bored out axially to slidably receive a stem or pin 67 which is provided at its outer end with a head 68 which fits between the arm portions 56 of the jaw mount. The head 68 is provided with a substantially V-shaped notch, whereby inwardly and downwardly inclined cam walls 69 are formed. The cam walls 69 are designed to cooperate with similar cam walls 70 formed on the portions of the jaw members 48 which extend into the V-shaped notch of the head 68. The opposite or inner end of the stem or pin 67 is provided with a collar 71 which is slidably received in a counterbore 72 in the inner end of the stem 55 of the jaw mount. A spring 73 interposed between the collar 71 and the bottom of the counterbore 72 serves to normally urge the cam headed stem 67 to move inwardly so as to permit the springs 61 to separate the jaws.

The record gripping jaws 48 are swung from an upwardly extending position in operative relation to records in the magazine as shown in Fig. 5, to a substantially horizontal position in operative relation to a record on the turntable substantially as shown in Fig. 13, through the agency of a connection between the cam shaft 66 and the jaw carrier 63. The cam shaft 66 is rotated by means which will presently be described. The connection between the cam shaft 66 and jaw carrier 63 includes a disc 74 which is secured on the cam shaft 66 in fixed relation thereto and a pin 75 which is slidably mounted in a portion of the jaw carrier in alignment with the disc 74. As best shown in Fig. 12, the jaw carrier 63 is provided with a boss 76 which is bored out to receive the pin 75. The boss 76 is also counterbored as indicated at 77 so as to receive a collar 78 carried by the pin 75 adjacent its inner end. A spring 79 is interposed between the collar 78 and the bottom of the counterbore 77 and serves to urge the pin 75 to move inwardly against the periphery of the disc 74. The latter is notched as indicated at 80 to receive the inner end of the pin 75 as shown in Fig. 12 so that there is a semi-positive driving connection between the cam shaft 66 and the jaw carrier.

The cam shaft 66, during normal operation of the record transferring mechanism rotates slightly less than one full revolution forward and the same amount backward. However, the actual swinging movement imparted to the jaw carrier and record clamping jaws is considerably less than the full extent of rotation of the shaft 66, it being only necessary to swing the jaw carrier from its upwardly and rearwardly extending position as shown in Fig. 5 to horizontal forwardly extending position as shown in Fig. 13 (approximately 130 degrees). Rearward swinging movement of the jaw carrier, i. e. from its horizontal forwardly extending position to its rearwardly and upwardly extending position as shown in Fig. 5 is limited by engagement of the boss portion 76 of the jaw carrier with a stop portion 81 which is formed integral with the frame 27. When such engagement occurs, the notched disc 74 continues its rearward rotation and forces the pin 75 to move outwardly, whereupon its outer end enters an aperture 82 which is provided in a flange or lip portion 83 which is formed integral with the stop 81 and frame 27 (see Figs. 5 and 14). When the pin 75 enters the opening 82, the jaw carrier 63 is locked in its proper operative relation to the record magazine.

Upon forward rotation of the shaft 66, the pin 75 will reenter the notch 80 in the disc 74, whereupon the jaw carrier will be swung in a forward direction until its operative horizontal position, as illustrated in Figs. 9, 13 and 14, is reached. Forward swinging movement of the jaw carrier is stopped by engagement of a bar element 84 which extends between and is formed integral with the outer ends of the respective pairs of bosses 53, with a stop bar 85 which extends between and is formed integral with oppositely disposed frame portions 27. When the horizontal position is reached by the jaws and jaw carrier, such engagement prevents the disc 74 from further rotating the jaws with the result that the pin 75 is again forced outwardly and caused to enter an aperture 86 (Fig. 14) provided in an upwardly extending flange-like portion 87 of the frame 27. By this means, the jaws are locked in operative relation to the turntable and a record thereon, while the cam shaft 66 is permitted to continue its rotation to effect further operations.

As shown in Fig. 2, the record gripping jaws 48 initially assume a position adjacent the periphery but outside the area of the records R in the record magazine. When the magazine has been adjusted to locate the desired record opposite the gripping jaws, the jaws are moved inwardly so as to overlap the adjacent marginal portion of the record as indicated in Fig. 5. Such inward movement of the jaws is effected by means of a pair of cams 88 which may be formed integral with a third cam 89, the entire cam unit being fixedly mounted on the shaft 66. The cams 88 engage a collar 89ª which is rotatably mounted on the inner end of the sleeve 55. The collar 89ª bears against a collar 90 which is fixedly secured to the stem 55, anti-friction bearings being interposed between the collars 89ª and 90 as shown. A spring 91 interposed between the collar 90 and the cross arm portion 65 of the carrier 63 serves to normally urge the jaw mount to move inwardly so as to maintain the collar 89ª in engagement with the cams 88. In Fig. 12, the jaw mount is shown in its outermost position, wherein a record R enters between the jaws 48, this position corresponding to that shown in Fig. 5. The cams 88 are properly shaped to permit the spring 91 to retract the jaws at the proper times.

For moving the jaws towards each other against the pressure of the springs 61, the cam 89 acts against the inner end of the stem 67 to force the cam head thereof to act on the cam surfaces 70 of the respective jaws in a manner readily understood by inspection of Fig. 12. The cam 89 is, of course, shaped so as to allow the cam headed pin 67 to be retracted by the spring 73 at the proper times to free the record.

Turning movement of the record and jaws 48 about the axis of the pin 67 and stem 55 is effected as an incident to their movement from the magazine to the turntable so as to deliver the record in horizontal position to the turntable. The means for effecting such turning movement includes a jaw turning device 92 which is in the form of a U-shaped device (see Fig. 9) having the upper ends of its respective arms provided with pins or studs 93 and 94 respectively. The U-shaped member 92 is provided with a boss 95 in its bottom which is suitably bored out and mounted on the drive shaft 29. As best shown in Fig. 13, a bushing 96 is seated in a portion of the frame 27 so as to support the turning device 92 for pivotal movement about the axis of the shaft 29. Wear on the U-shaped device by reason of constant rotation of the shaft 29 is thus eliminated and free running of the shaft 29 is not hampered.

A laterally extending boss 97 is formed integral with the boss 95 of the U-shaped member and a rod 98 is mounted in and projects from the boss 97 as clearly shown in Figs. 9 and 19. The free end of the rod 98 is provided with a spherical formation 99 which fits in an opening in the free end of a lever 100 which is pivoted as indicated at 101 on a bracket lug formed integral with the frame 27 (see Fig. 2). Intermediate its ends, the arm 100 is provided with a pin or stud 102 which fits in a generally circular zig-zag cam-way 103 formed in a disc 104. The disc 104 is supported for rotation by a shaft 105 which is rotatably supported in suitable bearing brackets such as indicated at 106—106, the latter being conveniently formed integral with the frame 27. The shaft 105 and disc 104 are rotated step by step by means which will presently appear. Such rotation of the disc 104 serves, through the cam-way 103 and lever 100 to effect rocking of the jaw turning device 92 about the axis of the shaft 29 so as to cause one of the studs 93 or 94 to be aligned with the open end of one of the notches 58—58, while the other stud 93 or 94 is moved out of the path of travel of the notches 58—58. By reference to Fig. 10, it will be seen that the stud 93 is shown in the path of travel of the adjacent notch 58 while the stud 94 is out of the path of travel of its adjacent notch 58.

Upon downward swinging movement of the jaw carrier, the flange elements 57—57 are guided between guide plates 107—107 which are formed integral or suitably mounted on the frame and provided with suitable inwardly facing guide surfaces 108. By reason of the straight portions 109 of the flange elements 57—57, the jaws are caused, during the initial portion of their downward movement, to hold the record in substantially vertical position, thereby effecting removal of the record from the magazine before any material extent of turning movement is imparted to the record. When the jaws and record reach a predetermined position near the horizontal, one of the notches 58 engages whichever stud 93 or 94 is in operative position (93 in Figs. 9 and 10), whereby the stud becomes a pivot about which the jaw mount is turned. Of course, the jaw mount also turns about the axis of its stem 55 which travels through a fixed path of travel. The elongated slots 58 serve, however, to permit relative sliding movement between the stud 93 and flange which it engages, while also constituting a pivot.

When a record has been played, means which will presently be described causes the shaft 66 and inward carrying jaws to travel in the reverse direction to return the record to the magazine. During such returning movement, the stud last engaged by the flange 57 is again engaged to return the jaws from horizontal to vertical position. The rear corner portions of the flanges 57 are rounded off as indicated at 110 to facilitate the turning movement just described. It will be seen that by bringing the studs 93 and 94 successively into operative position, the record carrying jaws will be caused to turn in opposite directions so that both sides of a double faced record may be successively played.

*Cam shaft driving means*

The cam shaft 66 is driven alternately in opposite directions by means of a driving connection from the continuously driven shaft 29. These driving connections include the following mechanism:—A short countershaft 111 (see Figs. 13 and 19) is mounted for rotation in a suitable boss 112 formed integral with the frame 27 and this countershaft is continuously driven by means of a gear connection with the main shaft 29, the said gear connection being designated 113 in its entirety. The opposite end of the countershaft 113 is provided with a bevel pinion gear 114. The bevel pinion gear 114 is adapted to mesh alternately with bevel gears 115 and 116 which are fixedly mounted on projecting end portions of an elongated pinion gear 117. The gear assembly 115, 116 and 117 constitutes a unit which is freely rotatable on a shaft 118 which extends transversely of the main shaft 29 and is journalled in suitable frame lugs 119 (see Figs. 7 and 19). The composite gear unit just mentioned is maintained against endwise movement on the shaft 118 by means of collars 120 which are pinned to the shaft 118. The pinion gear 117 meshes with a gear 121 which is suitably secured to the cam shaft 66 so as to impart rotation thereto.

For alternating the direction of rotation of the gears 117 and 121 and of the cam shaft 66, the shaft 118 is caused to move endwise to alternately effect intermeshing of the bevel gears 115 and 116 with the bevel pinion gear 114. Such endwise movement is imparted to the shaft through a spring device which is actuated by means of a connection with the shaft 66.

The spring device just referred to includes a spring 122 which is positioned around the shaft 118 and interposed between a pair of thimbles 123 and 124 which are also mounted on the shaft 118, the thimble 124 being pinned thereto as clearly indicated in Fig. 7. Each of the thimbles has an annular flange 125 at its inner end. A cage or barrel 126 has an integrally formed, inwardly extending flange 127 at one end adapted to cooperate with the flange 125 of the adjacent thimble 124, and a removable head 128 at the other end of the barrel 126 provides an inwardly extending flange 129 which is adapted to engage the annular flange 125 of the adjacent thimble 123. It will be seen that the spring 122 normally tends to force the thimbles 123 and 124 apart, such spreading thereof being limited by engagement of their respective flanges 125 with the respective flanges 129 and 127 of the barrel 126.

A cam disc 130 is secured to the shaft 66 so as to rotate therewith and it is provided with a pair of laterally extending, circumferentially spaced pins 131 and 132 respectively, which are adapted to engage an upstanding portion 133 of a bell crank 134. The bell crank 134 is pivoted as indicated at 135 on a portion of the frame and its other arm is provided with a depending pin 136 which fits between a pair of pins 137—137 which project laterally from the barrel 126 (see Figs. 5, 7, 19 and 20).

When the record transferring jaws 48 are in initial position as shown in Fig. 2, the shaft 118 is in its extreme left hand position (not illustrated). At such time, the spring barrel 126 is also in its extreme left-hand position, and the upstanding member 133 of the bell crank 134 is in position to be engaged by the pin 132 upon completion of the forward rotation of the cam shaft 66. When the pin 132 engages the upstanding part 133 of the bell crank 134, the latter is swung so as to move the barrel 126 towards the right, substantially to the position shown in Figs. 19 and 20. When the cylinder 126 moves in that manner, the spring 122 contained therein is compressed and tends to move the shaft 118 towards the right.

Right handed movement of the shaft 118 is initially limited by engagement of its right hand end with a stop 138 which is carried by a bar 139. The bar 139 is slidably mounted adjacent its opposite ends in suitable guideways 140—140 which may conveniently be formed integral with the frame 27. A spring 141, stretched between a portion of the frame or one of the guideways 140 and a part of the bar 139 urges the bar 139 to move forwardly. Such movement is normally prevented by a pawl 142 which is pivoted at one end as indicated at 143 on the frame, the other end of the pawl being shaped to enter a notch 144 in the bar 139. A leaf spring 145 normally holds the pawl 142 in engagement with the bar 139.

During forward movement of the record transferring device, the shaft 118 occupies its extreme left hand position wherein the gears 114 and 116 are in engagement for transmitting proper rotation to the cam shaft 66. When the record is delivered to the turntable and released from the clamping jaws 48, the pin 132 on the disc 130 effects the above described compression of the spring 122 to thereby effect movement of the shaft 118 towards the right. Such right hand movement, as above stated, is limited by engagement with the stop 138 which is so arranged as to stop the shaft 118 at a point to maintain both of the bevel gears 115 and 116 out of engagement with the pinion gear 114, i. e. in a neutral position, whereby rotation of the cam shaft 66 ceases.

When the record on the turntable is completely played, an electro magnet 146 is energized and acts on a soft iron extension 147 of the pawl 142 to disengage the pawl from the bar 139. Thereupon the spring 141 causes the bar and stop 138 to move forwardly to substantially the position indicated in Fig. 20. Upon such movement, the shaft 118 is permitted to move further to the right under the stored up power of the spring 122, thereby to effect intermeshing of the bevel gears 115 and 114. The pinion gear 117 is thus driven in the reverse direction to thereby effect reverse rotation of the cam shaft 66 and return movement of the record carrying jaws.

Incidentally, it might be noted that an insulating material element 222, carried by the bar 139 serves to separate resilient electric contact members 223 and 224 when the bar 139 is moved forwardly by the spring 141. The contact elements 223 and 224 constitute a switch which is incorporated in the electric circuit of the magnet 146, and it will be observed that the circuit to the magnet is broken immediately after the pawl 142 is withdrawn from engagement with the bar 139. The contacts 223 and 224 are, of course, mounted on a suitable insulating material element which is carried by a conveniently accessible portion of the frame.

It is desirable to provide means for locking the gears 115 and 116 in operative engagement with the driving gear 114, and for this purpose, the shaft 118 is provided with a cylinder 148 which is provided with annular flanges 149 and 150 at its opposite ends. The cylinder 148 is fixedly mounted on the shaft 118. A pair of locking dogs 151 and 152 of bell crank formation are disposed in opposite arrangement and pivoted on a common pivot 153 on a part of the frame 27 (see Figs. 17, 19 and 20). The locking dogs 151 and 152 are connected by a spring 154 which tends to rock them into engagement with the surface of the cylinder 148. When the shaft 118 is in its left-hand position, the dog 151 engages the shoulder or flange 149 to lock the shaft in such position, and when the shaft is in its extreme right-hand position as illustrated in Fig. 20, the dog 152 engages the shoulder 150 to lock the shaft in such position. When the cylinder 126 is moved to the right as above explained, the dog 151 is released from the shoulder 149 by means of a finger 155 which is carried by the cylinder and provided with a laterally extending end portion 156 which extends upwardly between the spring connected arms of the bell crank dogs 151 and 152. As shown in Fig. 19, the finger portion 156 engages one arm of the dog 151 to rock the dog out of engagement with the stop flange 149. When the shaft 118 is permitted to move to its extreme right-hand position as shown in Fig. 20, the dog 152 is caused, by the spring 153, to drop behind the stop shoulder 150. Upon movement of the cylinder towards the left as will hereinafter be described, the finger portion 156 engages the arm of the bell crank dog 152 to disengage it from the shoulder 150 to thereby again permit the shaft 118 to move under the influence of the spring 122. It will be observed that because of the play between the spring connected arms of the bell crank dogs, the spring 122 is permitted to be compressed a considerable extent before any movement is imparted to the shaft 118. Hence, the shaft 118 is caused to move with a quick or snap action.

When the cam shaft 66 is rotated rearwardly to effect transferring of a record from the turntable to the magazine, the movements imparted to the record gripping mechanism are, of course, in the reverse order to those explained in connection with the transfer of a record from the magazine to the turntable. The pin 131, carried by the disc 130, then acts, near the end of the rearward rotation of the shaft 66, against the upstanding portion 133 of the ball crank 134 to effect movement of the spring barrel 126 towards the left as above mentioned. Such movement imparted to the spring barrel 126 has the effect of moving the shaft 118 towards the left upon completion of the record return operation, and serves to effect re-engagement of the gears 116 and 114 preparatory to a new record transferring operation. Upon reengagement of the gears 114 and 115, the record transfer mechanism operates to transfer the same record back to the turntable, but turning it in the opposite direction to play the other face, or to transfer a new record to the turntable.

*Means for actuating coin control mechanism*

Automatic phonographs of the type herein described are often equipped with coin control devices which require the insertion of one coin for each record to be played. When the phonograph is so equipped, I prefer to provide means for stopping the operation of the phonograph just prior to shifting of the shaft 118 and gears 115 and 116 relative to the driving gear 114. In the present instance, a cam 157 is mounted on the cam shaft 66 for actuating a lever 158 which is pivoted as indicated at 159 on a part of the frame. The free end of the lever 158 is connected to a coin operated electric switch in such a manner that when the lever is swung downwardly, the coin controlled switch is actuated to break the electric circuit to the driving motor 28. The lever 158 is actuated through an arm 160 which is pivoted near its lower end to an intermediate portion of the arm 158, the free end of the said arm 160 being acted upon by the cam 157 (see Fig. 17). A spring 161 normally tends to maintain the arm 160 in upwardly extending position and against a stop 162 which is formed integral with the arm 158.

In Fig. 17, the parts are shown in the positions which they occupy when the record transfer device is disposed in forwardly extending position while a record is in playing position of the turntable. Hence, it will be understood that the next operative movement of the cam shaft 66 and cam 157 will be in a counterclockwise direction so that the cam 157 will act against the arm 160 to force the same to swing downwardly. Inasmuch as the arm 160 is held against forward and downward swinging movement about its pivotal mounting on the lever 158, the downward movement of the said arm 160 will be imparted to the lever 158 to thereby actuate the electric switch to break the motor circuit. Inasmuch as the shaft 66 and cam 157 will turn just slightly less than one complete revolution, it will be seen that the high point of the cam 157 will pass the end of the arm 160 whereupon a suitable spring, which may conveniently be a part of the coin control mechanism (not shown), will restore the lever 158 and arm 160 to its initial position substantially as shown in Fig. 17. When the electric circuit to the motor is again completed by the deposition of a proper coin, the cam shaft 66 and cam 157 will be caused to rotate in the reverse direction. Upon such rotation, the cam acts to swing the arm 160 rearwardly about its pivotal mounting on the lever 158 against the tension of the spring 161 and without effecting movement of the switch controlling arm 158.

I prefer to time the cam 157 and spring barrel actuating pin 131 so that the motor circuit will be broken just prior to actuation of the barrel 126 and shifting of the gears 115 and 116 relative to the driving gear 114. Hence, it will be understood that the mechanism comes to rest when the record transferring device has returned a record to the magazine and withdrawn from the magazine to its initial position as shown in Fig. 2. Then when the motor circuit is again completed, the countershaft 66 will be caused to continue its rearward rotation for a fraction of a revolution until the pin 131 actuates the spring barrel 126 to effect shifting of the gears as above described. As soon as such shifting is effected, the record transferring mechanism is again actuated to grip a record and transfer it from the magazine to the turntable.

*Record magazine shifting mechanism*

The record magazine is shifted by means of a cam 163 which is mounted on the shaft 105 for rotation thereon in unison with the disc 104. The cam 163 is provided with a plurality of seats 164 which are progressively stepped outwardly from the axis of rotation of the cam, the number of seats corresponding to the number of records to be handled by the record magazine. As clearly shown in Fig. 2, there is a radially extending edge 165 which connects the inner and outer, or lowest and highest seats of the cam 163.

The cam 163 acts against a roller 166 which is carried by the connecting pivot pin 167 of a pair of arms 168 and 169. The arm 168 is mounted on a fixed pivot as indicated at 170. The arm 169 is pivotally connected at 171 to the end of one arm of a bell crank 172 which is pivoted as indicated at 173 (Fig. 1) on a part of the frame 27. The free end of the other arm of the bell crank 172 is provided with an upwardly projecting pin 174 which enters a guideway 175 formed in a part of the magazine frame.

When the cam 163 acts on the roller 167 to force it outwardly from the center of the shaft 105, the bell crank 172 is caused to swing about its pivot 173 (in a counterclockwise direction in Fig. 1) to thereby shift the record magazine one step to the left as viewed in Fig. 7 (towards the bottom of Fig. 1).

The shaft 105 and cam devices carried thereby are rotated step by step by means of a pawl and ratchet arrangement. The ratchet is designated 176 and is secured to the disc 104 and cam 165 so that said parts constitute a unit adapted to rotate as such on the shaft 105. A pawl 177 is pivoted on the free end of an arm 178, the other end of which arm is pivotally mounted as indicated at 179 on an upstanding lug part of the frame 27. Intermediate its ends, the arm 178 is provided with a laterally projecting pin 180 which is adapted to be engaged by a cam projection 181 formed on the periphery of the disc 130.

By reference to Fig. 17, it will be seen that when the disc 130 makes its next revolution (in a counterclockwise direction), the cam 181 will engage the pin 180 to effect upward swinging movement of the arm 178, whereby the pawl 177 imparts one step of clockwise turning movement to the ratchet 176, and the cam disc and cam 104 and 163 respectively. At the end of the counterclockwise turning movement of the disc 130, the cam 181 will be disposed under the pin 180 so that upon starting forward or clockwise turning movement, the pin 180 will be permitted to ride down the surface of the cam 181 until it again rests on the periphery of the disc 130, as shown in Fig. 17.

Inasmuch as the cam shaft 66 makes one forward and one rearward rotation for each record played, it will be understood that one step of rotation is imparted to the cam disc 104 and cam 163 for each record played. Inasmuch as the mechanism is operative to play both sides of each record successively, it is, of course, desired to shift the record magazine only once for every other selection played. To effect such shifting of the magazine, the cam steps 164 of the cam 163 are elongated so that one step of rotation of the cam will merely change the position of the roller 166 on the same seat of the cam, while the next step of rotation of the cam will effect outward movement of the roller 166 and consequent shifting of the magazine.

When the entire series of records in the magazine has been played, the roller 166 is permitted to ride off the end of the highest cam seat 164, down the radial connecting edge 165 to the lowest cam seat 164. Such movement permits a spring 182 (Fig. 1) connected between the upstanding frame part 41 and a point on the magazine frame to retract the magazine from its advanced position at the left-hand side of the machine to its fully retracted position at the right-hand side of the machine. Such movement of the magazine is, of course, transferred through the bell crank 172 to the arms 169 and 168 so as to cause the cam roller 166 to ride down the radial cam edge 165. A suitable dash-pot arrangement 183 may be provided for preventing jars and shocks incident to return movement of the magazine.

*Manual record selection*

It is desired to provide means whereby any one of the records in the magazine may be selected for playing without regard to its position in the turntable. For this purpose, the shaft 105 is provided with a ratchet element 184 which is non-rotatably but axially slidably mounted on the said shaft. A spring 185 (Fig. 9) normally urges the said ratchet 184 to move towards a cooperating ratchet formation 186 on the adjacent face of the ratchet 176. During the playing of a record and during the ordinary operation of the phonograph, the ratchet 184 is maintained out of engagement with the ratchet element 186 by means of a cam controlled lever 187 which is pivoted intermediate its ends as indicated at 188 on a stud 189 which is carried by the frame or guide part 106 (see Figs. 9 and 17).

The upper end of the lever 187 is properly shaped to fit in a groove 190 formed in the ratchet element 184 so that the lever 187 is capable of shifting the said ratchet against the pressure of the spring 185. The lower end of the lever 187 is provided with a laterally extending portion 191 (see Fig. 17) which extends into overlapping engagement with a side portion of the disc 130. The said side portion of the disc 130 is provided with a recess 192 into which the lever portion 191 may enter at such times as the electric circuit to the motor is broken and the mechanism rendered stationary. When the said lever portion enters the notch 192, the spring 185 is, of course, permitted to slide the ratchet 184 into engagement with the ratchet element 186, whereupon rotation of the shaft 105 will be operative to rotate the cam disc 104 and magazine feed cam 163. The ratchet arrangement 184 and 186 is, of course, such that it is capable of rotating the cam disc and cam only in the forward direction. For facilitating manual turning of the shaft 105, it is provided with a gear 193 which is engaged by a pinion gear 194 carried by the shaft 195 of a hand knob 196. By reason of the described gear connection 193 and 194 between the hand knob 196 and shaft 105, manual turning of the shaft 105 is rendered comparatively easy.

Because of the fact that it is comparatively easy to turn the cam 163 for manually selecting the record to be played, there is a tendency to turn the cam so fast that record No. 1 will be unintentionally passed by. This tendency, in the case of No. 1 record is augmented by the fact that the cam roller 166 rides off the high cam seat 164 and travels inwardly to the lowest cam seat 164. When the cam roller 166 leaves the high cam seat 164, the latter is freed from the resistance incident to the pressure applied thereto by the magazine returning spring 182.

In order to temporarily lock the cam 163 against such overturning movement, the following locking mechanism is provided:—

A lever 211 is pivoted at one end as indicated at 212 on the inside face of the cam 163. A stop pin 213 also carried by the cam 163 is provided for limiting outward swinging movement of the lever 211. The free end of the lever is provided with a seat portion 214 which coincides with a portion of one of the seats 209 and an extension 215. A small bell crank 216 is pivoted as indicated at 217 on the inside face of the cam 163 and is so arranged that its short arm 218 engages the adjacent edge of the lever 211 to hold the latter against its stop pin 213. A spring 219 connected between the bell crank arm 218 and a portion of the cam 163 serves to normally urge the bell crank into the position illustrated in Fig. 2 wherein the lever 211 is held against the stop pin 213. The other arm 220 of the bell crank 216 is elongated and projects beyond the radial edge 165 of the cam 163.

When the cam 163 and disc 104 are rotated to cause the cam roller 166 to leave the high cam seat 164, the roller 208 enters the seat 209 with which the stop lever 211 is associated. In the event that the cam and disc are rotated so fast that the cam roller 208 enters the new seat 209 before the cam follower 166 engages the lowermost seat 164, further rotation of the cam and disc will be prevented by the projecting end portion 215 of the stop lever 211. The arm 201 is limited in its rocking movement by a stop 221 so that the cam roller 208 can not swing outwardly enough to pass the projecting end 215 of the stop lever.

When the cam follower 166 actually reaches its lower-most cam seat 164, it engages the arm 220 of the bell crank 216 and swings the same on its pivot against the tension of the spring 219 to thereby unlock the lever 211 to permit the same to swing inwardly on its pivot 212. When the stop arm is thus permitted to swing inwardly, the projecting end portion 215 will be retracted so as to permit the disc 104 to be further rotated to manually select the desired record.

In addition to preventing overturning of the cams in the manual selection of a record to be played, the described locking mechanism serves to prevent similar overturning of the cams during the automatic operation of the mechanism, and thereby insures playing of the first selection after completion of the last selection. Also, in the event that the magazine resists return movement to such an extent that the first record is not properly aligned with the record gripping jaws, the member 201 will be held in displaced position in which the electric motor circuit is broken so that the operation of the magazine cannot take place until the parts are properly adjusted.

Motor circuit control

For preventing the establishment or completion of an electric circuit to the motor during such time as the ratchet 184 is in engagement with the ratchet formation 186, a switch device incorporated in the motor circuit is associated with the lever 187. This switch device includes (see Figs. 1, 17 and 18), a reversed L-shaped contact element 197 which is carried by a block 198 of insulating material secured to the lower end portion of the lever 187. The contact 197 also includes a leg 199 to which a conductor 200 constituting part of the motor circuit may be connected. An arm 201 is pivoted intermediate its ends as indicated at 202 on a conveniently accessible portion of the frame 27. The inner free end of the arm or lever 201 is provided with an enlargement which is bored out to receive an insulating material tube 203, within which is slidably mounted an electric contact element 204. The contact element 204 is normally urged into contact with the reversed L-shaped terminal 197 by means of a spring 205 which is interposed between the rear end of the contact element 204 and a terminal 206. The terminal 206 has connected to it a conductor 207 which also forms a part of the motor circuit. The conductor 207 enters the tubular insulating element 203 through suitable apertures in the end of the arm 201 and the insulating tube, and is suitably connected to the terminal element 206. The connection between the conductor 207 and terminal 206 may conveniently be effected by pulling the conductor through the opening in the insulating tube 203 and attaching it to the terminal 206 and then pulling the conductor and attached terminal rearwardly through the tube. Other arrangements for facilitating connection of these elements may also be provided.

The other end of the lever 201 is provided with a laterally projecting roller 208 which is adapted to seat in notches such as 209 in the periphery of the disc 104. A spring 210 stretched between the lever 201 and a suitable anchorage carried by the frame 27 serves to normally urge the lever 201 to occupy its operative position whereon the roller 208 is seated in one of the notches 209.

When the ratchet 184 is in engagement with the ratchet 186 and the mechanism thus rendered manually adjustable, the arm 187 is swung to approximately vertical position as indicated in Fig. 18 (compare Figs. 9 and 18) wherein the contact element 204 is in engagement with the offset lower leg portion of the reversed contact element 197. When the disc 104 is caused to turn through the provision for manual record selection, the roller 208 is forced out of one of the notches 209 to thereby rock the lever 201 on its pivot 202 against the tension of the spring 210. When the lever is so rocked, the contact element 204 rides off of the lower offset portion of the contact element 197 and merely engages the face of the insulating block 198, thereby breaking the motor circuit so that even though a coin were deposited to thereby complete the circuit so far as the coin control switch is concerned, the circuit would nevertheless remain broken. However, the contact element 204 would again be permitted to engage the offset portion of the contact 197 when the disc 104 is rotated sufficiently to permit the roller 208 to enter another notch 209. Thereupon the motor circuit would be completed and the mechanism set into operation. The recess 192 in the disc 130 is very short and almost immediately upon rotation of the cam shaft 66 and the disc 130, the ratchet clutch controlling lever 189 would be forced out of the recess and the ratchet clutch disengaged to thereby prevent further manual adjustment of the mechanism.

Sound reproducer or pick-up mechanism

An electric pick-up device is illustrated although it is, of course, to be understood that an ordinary mechanical producer may be substituted. The pick-up herein disclosed includes the head element 225 which carries a suitable needle or stylus 226 for engaging the sound groove of a record. The head 225 is mounted at one end of an arm 227, the other end of the arm being pivoted as indicated at 228 for vertical swinging movement. The pivot 228 is mounted in a cradle 229 which has a vertically extending stem or post portion 230 which is rotatably mounted in a suitable bearing in a lever 231. The arm 227 and stem 230 may be tubular so as to receive an electric conductor which is connected at one end to a contact element 232 mounted in the arm 227. Other conductors connected with the pick-up head 225 may extend through the hollow arm 227 and stem 230 to their connections with electrical reproducing and amplifying mechanism (not shown). The contact element 232 is insulated from the arm 227 by means of a suitable insulating bushing 233, and it is provided with an adjustable screw 234 and a swinging contact element 235. The purpose of these parts will presently be explained.

The lever 231 is pivoted near one end for vertical swinging movement on a pivot pin 236 which is mounted in a boss 237 formed integral with the adjacent guide element 107. The free end of the lever 231 is provided with a supporting shelf-like portion 238 which is adapted to engage a lug 239 which depends from the pick-up arm 227. The supporting shelf 238 is preferably provided with a groove 240 for receiving a tongue portion 241 of the pick-up arm when the arm is swung to upwardly extending position to thereby hold the arm in predetermined, outwardly disposed position.

The pivoted end of the lever 231 is also provided with a rearwardly extending leg 242 which is provided with a cam roller 243 adapted to engage the inside of a cam flange 244. The cam 244 extends laterally from a cam head 245 which is mounted on the cam shaft 66 for rotation therewith. Another cam 246, mounted on the cam shaft 66 within the cam flange 244, is provided for acting on the ball end 247 of an arm 248 which is secured to the lower end of the post 230 which projects through the lever 231. The cam 246 may conveniently be formed integral with the cam head 245 and cam flange 244, if desired (see Fig. 8).

The operation of the pick-up arm is substantially as follows:—

When the mechanism is in its initial position, the pick-up arm is disposed in an upwardly extending position substantially as shown in Figs. 5 and 21. The cam flange 244 serves to hold the arm in such upward position by reason of engagement of the cam flange with the roller 243. The arm 227 is also in an outwardly disposed position by reason of the action of the cam 246 on the ball end of the lever 248.

When the mechanism is operated to place a record on the turntable, the cam shaft 66 and cam elements 244 and 246 rotate in a clockwise direction as viewed in Figs. 5 and 21. When the record is far enough advanced towards the turntable, the cam 244 permits the lever 231 and arm 227 to swing downwardly by gravity until the stylus 226 engages the record just placed on the turntable. By reason of the pivotal mounting 228 of the arm 227, slight movement of the lever 231 is permitted after the stylus 226 engages the record. Such additional movement of the lever serves to disengage the tongue and groove 241 and 240 to permit free movement of the pick-up across the face of the record. Inasmuch as the pick-up arm 227 is initially in its outermost position as shown in Fig. 1, the stylus will normally engage the outermost portion of the sound groove of the record. To insure engagement of the stylus with the playing groove of the record, the axis of the turntable may be canted slightly so as to cause the turntable and the record thereon to slope slightly downwardly from the side on which the pick-up initially engages the record. The pick-up is then caused to engage the smooth marginal portion of the record, and the slope of the record causes the pick-up to travel inwardly across said smooth portion until the starting end of the sound groove is engaged.

The cam 246 is inactive during the movement of the arm 227 to playing position although it does, of course, rotate in unison with the cam 244.

When the playing of the record is completed, the set screw 234 of the contact element 232 engages a contact member 249 (Fig. 9) which is connected through the agency of a spring 250 to a terminal 251 to which a conductor 252 is connected. The conductor 252 constitutes part of the circuit to the electro-magnet 146 which, when energized, causes the cam shaft 66 to rotate in the reverse direction to return the playing record to the magazine.

The contact element 249 is mounted on an insulating material bracket element 258 which is mounted on the frame 27. The element 249 is yieldingly maintained by the spring 250 in its upright position wherein it is adapted to be engaged by the contact screw 234. A stop pin 259 serves to limit swinging movement of the element 249 under the influence of the spring 250.

The swinging element 235 is adapted to engage the serrated upper edge of a member 260 which is pivoted as indicated at 261 on the insulating material member 258. A spring 262 normally maintains the member 260 in predetermined position and against a stop pin 263 which is carried by the insulating material member 258. When the pick-up arm is in playing relation to a record, the member 235 assumes an inclined position between its pivot and the serrated edge of the member 260.

In the event that operation of the magazine is to be manually stopped, the pick-up arm 227 is raised slightly and given a backward swinging movement so as to cause the lower edge of the hinged element 235 to engage one of the serrations of the member 260. The member 235 will swing through a vertical position and thereby depress the engaged portion of the member 260 to cause the tail portion 264 of said member to engage the member 249. An electric circuit is thereby established through the members 232, 235, 260, 264, 249, and the spring 259, whereby the magnet 146 will be energized and the record transferring mechanism set into operation even though the record has not been completely played. Accidental backward movement of the pick-up arm will, of course, also effect stoppage of the mechanism by reason of the engagement of the hinged member 235 with the serrated edge of the member 260, as above explained.

During such return movement of the played record, the cams 246 and 244 are, of course, rotated in a counterclockwise direction as viewed in Figs. 15 and 21 and the cam 244 acts on the roller 243 to swing the lever 231 upwardly in a counterclockwise direction about its pivot 236. By reason of the mounting of the pick-up arm 227 on the lever 231, the said pick-up arm is also swung upwardly away from the turntable. The cam 246 also acts on the ball end 247 of the lever 248 to swing the arm 227 about its vertical pivot 230 from innermost to its outermost position wherein it is again held by engagement of the tongue 241 in the slot 240.

As previously explained, when the magnet 146 is energized, the bar 139 is moved forwardly by the spring 141. For restoring the arm 139 to its initial position, the cam 245 is provided with a laterally projecting pin 253 which is adapted to engage the upwardly projecting end of a dog 254 which is pivoted as indicated at 255 on the bar 139. A spring 256 normally holds the dog 254 in upwardly extending position and against a stop pin 257 which is also carried by the bar 139.

When the cam 245 rotates in clockwise direction to place the pick-up in operative engagement with a record, the pin 253 engages the front edge of the dog 254 and, as an incident to the last portion of rotation of the cam 245, moves the bar 139 rearwardly against the tension of the spring 141. Upon counterclockwise rotation of the cam 245, the pin 253 engages the rear edge of the dog 254 and merely causes the dog to swing on its pivot 255 against the tension of the spring 256 without imparting any movement to the bar 139.

Operation of the mechanism

The operation of the various parts of the described mechanism has been explained in connection with the description of such parts, but to facilitate understanding of the complete cycle of operation, the following brief explanation is made:—

The initial or starting position of the phonograph mechanism is illustrated in Figs. 2, 3, 4 and 21. The magazine may be considered in any predetermined position wherein a record is aligned with the transfer jaws 49 for the first playing of either side thereof.

When the mechanism is provided with a coin control device and a proper coin inserted, the electric circuit will be through the coin control switch C which is controlled by the lever 158, and through the contacts 204 and 197 to the motor (see wiring diagram, Fig. 24).

When the motor 28 is thus energized, power is transmitted through the shaft 29 to the countershaft 111 and through the gears 114 and 116 to the pinion 117, which in turn effects forward or clockwise rotation of the cam shaft 66. The cams 88 then become operative to force the record gripping jaws 48 into overlapping position relative to a marginal portion of the record, substantially as shown in Fig. 5. The cam 89 thereupon forces the cam-headed pin 67 outwardly to squeeze the record gripping jaws together to clamp the record therebetween, substantially as shown in Fig. 12.

During the above described movements, the locking pin 75 has been held in locking engagement with the apertured part 83 (Fig. 3), but when the cam 89 arrives at the position in which the record is clamped between the jaws as in Fig. 12, the recess 80 in the disc 74 becomes aligned with the locking pin 75 and permits the latter to be retracted by the spring 79 so as to unlock the record transfer mechanism (see Fig. 12).

Continued forward rotation of the cam shaft 66 and its various cams then acts to swing the jaw carrier and record holding jaws about the cam shaft 66 as a pivot, the engagement of the locking pin 75 with the recess in the disc 74 constituting a semi-positive driving connection between the record transferring mechanism and the cam shaft 66.

Forward and downward swinging movement of the record transferring mechanism continues until the cross bar element 84 of the jaw mount engages the frame element 85 (Fig. 13) to stop further swinging movement of the transferring mechanism. The locking pin 75 is then forced out of the recess 80 in the disc 74 and caused to enter the aperture 86 in the frame part 87 (Fig. 14) while rotation of the cam shaft 66 and parts connected thereto continues.

During the forward and downward swinging movement of the record carrier, and as an incident thereto, one of the notched flanges 57 of the jaw mount engages one of the turning pins 93 or 94 to cause the record clamping jaws to turn from vertical position to horizontal position as shown in Figs. 1, 9, 13 and 14. As soon as the jaws arrive at their horizontal position, the continued rotation of the cam 89 permits the spring 73 to retract the cam headed pin 67 to thereby permit the jaws to separate and release the record which is then resting on the turntable (see Figs. 13 and 14). The cams 88 are so shaped, however, that the jaws 48 remain in their overlapping position relative to the marginal portion of the record.

The turntable is continuously rotated through the described connections so that as soon as the record is released, by the jaws, the record begins to rotate with the turntable.

During the forward and downward movement of the record carrying mechanism, the pick-up and pick-up arm are also swung from initial upwardly extending position as shown in Fig. 5 to playing position as in Figs. 1 and 15.

When the record has been delivered to the turntable and the pick-up placed in operative engagement with the record, the pin 132 of the disc 130 swings the bell crank 134 to effect adjustment of the shaft 118 towards the right (in Fig. 7), with the result that the driving connection between the gears 114 and 116 is broken. In other words, the gears 115 and 116 are in a neutral position relative to the driving gear 114. Hence, rotation of the cam shaft 66 stops.

When the playing of a record has been completed the electro-magnet 146 is energized, the circuit being then through the spring contacts 223 and 224, through the contact element 251, 249, 234, 232, and through the magnet 146 (see the wiring diagram, Fig. 24). As above explained, the insulating material element 222 carried by the bar 139 serves to break the circuit just described almost immediately after it is completed so that the magnet 146 does not remain energized for more than a very brief period. Hence, the use of excessive current and the danger of burning out the magnet is eliminated.

When the bar 139 moves forwardly sufficiently to remove the stop element 138 from the path of movement of the shaft 118, the stored-up power in the spring 122 completes the movement of the shaft 118 to the right (in Figs. 7, 19 and 20). The final or extreme right-hand position of the shaft 118 is shown in Fig. 20 and in this position, the gears 115 and 114 are engaged, with the result that the cam shaft 66 is rotated in the reverse or counterclockwise direction to return the record from the turntable to the magazine.

The clamping action of the jaws on the record is first effected by engagement of the cam 89 with the inner end of the pin 67, whereupon the locking pin 75 is permitted to drop into the notch 80 of the disc 74, thereby unlocking the transfer mechanism from the frame part 87. Then the record transferring jaws swing upwardly, first engaging the turning stud or pin which had caused initial turning of the jaws from vertical to horizontal position. The jaws are thus restored to vertical position and the record transferred to its original place in the magazine. The cams 88 and 89 continue to rotate until the jaws release the record and withdraw from overlapping position relative to the marginal portion of the record and resume their initial or starting position as shown in Fig 2.

Near the end of the return movement, the cam 157 actuates the coin control switch to break the motor circuit, thereby to stop the rearward rotation of the cam shaft 66.

When another coin is deposited, or in the event that the coin control mechanism is eliminated and the mechanism operates continuously and automatically, the cam shaft 66 would continue its rotation for a slightly additional amount until the pin 131 actuates the bell crank 134 to return the shaft 118 to its initial position wherein the gear 116 meshes with the driving gear 114. Thereupon, the cam shaft 66 would again be driven in forward or clockwise direction.

Just prior to breaking of the circuit through the coin control switch and just prior to the time the pin 131 acts on the bell crank 134, the cam 181 actuates the pawl lever 178 and pawl 177 to advance the ratchet 176 and magazine feed cam 163. Inasmuch as the cam seats 164 are of such length that it takes two steps of movement of the cam to shift the record magazine, the first step of turning movement imparted to the cam will not shift the magazine. However, the cam disc 104 is advanced one step in unison with the cam 163 and it acts on the end 102 of the rod 98 to shift the turning fork 92 so as to align the other turning pin or stud 93 or 94 with the top of the flange which was not engaged in the previous record transferring operation. Hence, when the cams 88 and 89 and 74 again cause the jaws to grip the same record and to transfer it to the turntable, the jaws and record will be turned in the reverse direction about the axis of the stem 55 to thereby place the record on the turntable with its opposite face up. The pick-up device is then again brought into operative engagement with the record and the same playing and record return movements repeated in due course.

The next operation of the magazine shifting cam 163 will, of course, effect outward movement of the roller 166 and thus impart feed movement to the magazine to align a new record with the jaws. Thereafter, the same record feeding and turning movements are effected.

It will be observed that the operations of the mechanism described are all effected from a single cam shaft 66, whereby the mechanism may be made comparatively small and compact, with the additional advantage that the weight of the mechanism is maintained at a minimum.

By reference to the wiring diagram, Fig. 24, it will be seen that there are, in effect, two separate electric circuits, one for controlling the operation of the electric motor and the other for energizing the electromagnet 146. These circuits are adequately controlled so as to prevent improper operation of the mechanism.

I am aware that the described mechanism may be changed in many respects without departing from the spirit of my invention, the scope of which should be determined by reference to the following claims, the same being construed as broadly as possible consistent with the state of the art.

I claim as my invention:—

1. In an automatic phonograph, the combination of a record magazine, a turntable, and means for transferring a record from said magazine to said turntable comprising record clamping jaws adapted to engage a marginal portion of a record, a shaft, a jaw carrier pivotally mounted on said shaft, a jaw mount mounted in said carrier for movement towards and away from records in said magazine, said clamping jaws being mounted in said mount for movement towards and from each other, and means on said shaft for effecting such movement of said mount and jaws and pivotal movement of said jaws about said shaft.

2. In an automatic phonograph, the combination of a record magazine, a turntable, and means for transferring a record from said magazine to said turntable comprising record clamping jaws adapted to engage a marginal portion of a record, a cam shaft, a jaw carrier pivotally mounted on said cam shaft, a jaw mount mounted in said carrier for movement in a substantially radial direction relative to said cam shaft, said clamping jaws being mounted in said mount for movement towards and from each other, cam means on said cam shaft for effecting radial movement of said mount and movement of said jaws towards and from each other, and means for effecting pivotal movement of said jaw carrier about said shaft.

3. In an automatic phonograph, the combination of a record magazine, a turntable, and means for transferring a record from said magazine to said turntable comprising record clamping jaws adapted to engage a marginal portion of a record, a cam shaft, a jaw carrier pivotally mounted on said cam shaft, a jaw mount mounted in said carrier for movement in a substantially radial direction relative to said cam shaft, said clamping jaws being mounted in said mount for movement towards and from each other, cam means on said cam shaft for effecting radial movement of said mount and movement of said jaws towards and from each other, means for effecting pivotal movement of said jaw carrier about said shaft, and means for locking said jaw carrier against pivotal movement during the radial and clamping movements of said mount and jaws respectively.

4. In an automatic phonograph, the combination of a record magazine, a turntable, and means for transferring a record from said magazine to said turntable comprising record clamping jaws adapted to engage a marginal portion of a record, a cam shaft, a jaw carrier mounted on said cam shaft for swinging movement thereabout, a jaw mount mounted in said carrier for movement in a substantially radial direction relative to said cam shaft, said clamping jaws being mounted in said mount for movement towards and from each other, cam means on said cam shaft for effecting radial movement of said mount and movement of said jaws towards and from each other, and cam means carried by said cam shaft and operating in timed relation with said jaw actuating cam means to lock said jaw carrier against swinging movement about said shaft during the radial and clamping movements of said mount and jaws respectively.

5. In an automatic phonograph, the combination of a magazine for holding a plurality of records vertically edgewise, a turntable disposed in a substantially horizontal plane, and means for transferring records from said magazine to said turntable comprising record gripping jaws, a carrier for said jaws pivotally mounted for swinging movement about a horizontal axis, said jaws being rotatably mounted in said carrier and being provided with a flange element having a pair of oppositely disposed notches, a device having a pair of members respectively adapted to enter said notches to effect rotation of said jaws, and means for causing said members to alternately enter the respective notches in said flange element to effect alternate turning of said record carrier in opposite directions.

6. In an automatic phonograph, a pick-up having an arm extending therefrom, means for mounting said pick-up for horizontal and vertical swinging movement, said means comprising a lever pivotally mounted at one end for vertical swinging movement and having a support at its free end for engaging a portion of said arm, a cradle mounted on said lever for horizontal turning movement, said arm being pivotally mounted in said cradle for vertical swinging movement relative to said cradle and lever, and means for imparting vertical swinging movement to said lever whereby the latter effects vertical swinging movement of said pick-up, said arrangement being effective when the pick-up is lowered into engagement with the record to permit disengagement of said lever supporting portion and said arm portion to thereby permit free horizontal swinging movement of the pick-up under the influence of the sound groove of a record.

7. In an automatic phonograph, a pick-up having an arm extending therefrom, means for mounting said pick-up for horizontal and vertical swinging movement, said means comprising a lever pivotally mounted at one end for vertical swinging movement and having a support at its free end for engaging a portion of said arm, a cradle mounted on said lever for horizontal turning movement, said arm being pivotally mounted in said cradle for vertical swinging movement relative to said cradle and lever, means for imparting vertical swinging movement to said lever whereby the latter effects vertical swinging movement of said pick-up, and means acting on said cradle to effect horizontal outward swinging movement of the pickup, said arrangement being effective when the pick-up is lowered into engagement with the record to permit disengagement of the said lever supporting portion and said arm portion to thereby permit free horizontal swinging movement of the pick-up under the influence of the sound groove of a record.

8. In an automatic phonograph, the combination of a magazine for supporting a plurality of records, a turntable, means for transferring a record from said magazine to said turntable, said magazine being mounted for movement relative to said record transferring means whereby the magazine may be adjusted to position any selected record in operative relation to said transferring means, means for automatically effecting movement of said magazine, manually operable means for shifting said record magazine, means for automatically uncoupling said manually operable means from the magazine shifting mechanism when the phonograph is in operation and for automatically coupling the manually operable means to said mechanism upon completion of a predetermined cycle of operation, an electric motor for actuating the phonograph, and an automatically actuated circuit breaker for breaking the circuit of said electric motor when said manually operable means is coupled to said magazine shifting mechanism.

9. In an automatic phonograph, the combination of a record magazine, a turntable, means for transferring records from said magazine to said turntable, a pick-up for engaging the sound groove of a record on said turntable, a shaft for pivotally supporting said record transferring means, cam means on said shaft for actuating said record transferring means, for swinging the pick-up from its innermost position to its outermost position, and for effecting movement of said record magazine.

10. In an automatic phonograph, the combination of a record magazine, a turntable, means for transferring records from said magazine to said turntable and from the turntable to said magazine, means for automatically actuating said transferring means successively in opposite directions including a shaft, a pair of relatively spaced bevel gears carried by said shaft, a pinion adapted to mesh successively with said bevel gears, spring means for shifting said shaft and the gears carried thereby, locking means for holding said shaft in predetermined position, and a lost motion connection between said spring means and said locking means for releasing the latter after said spring means has been compressed to a predetermined extent, whereby the latter is operative to effect shifting of said gears with a snap action.

11. In an automatic phonograph, the combination of a record magazine, a turntable, a pick-up for engaging the sound groove of a record on said turntable, means for transferring records from said magazine to said turntable and from the turntable to said magazine, means for automatically actuating said transferring means successively in opposite directions including a shaft, a pair of relatively spaced bevel gears carried by said shaft, a pinion adapted to mesh successively with said bevel gears, spring means for shifting said shaft and the gears carried thereby, locking means for holding said shaft in predetermined position, a lost motion connection between said spring means and said locking means for releasing the latter after said spring means has been compressed to a predetermined extent, whereby the latter is operative to effect shifting of said gears with a snap action, and means controlled by the pick-up for maintaining said bevel gears disengaged from said pinion during the playing of a record.

12. In an automatic phonograph, the combination of a record magazine, a turntable, pick-up for engaging the sound groove of a record on said turntable, means for transferring records from said magazine to said turntable and from the turntable to said magazine, means for automatically actuating said transferring means successively in opposite directions including a shaft, a pair of relatively spaced bevel gears carried by said shaft, a pinion adapted to mesh successively with said bevel gears, spring means for shifting said shaft and the gears carried thereby, and means controlled by the pick-up for maintaining said bevel gears disengaged from said pinion during the playing of a record.

13. In an automatic phonograph, the combination of a magazine for holding a plurality of records, a turntable, means for transferring records from said magazine to said turntable, said magazine being movably mounted so as to permit positioning of the respective records carried thereby in operative relation to said transferring means, a cam for advancing said magazine step by step, means for insuring proper positioning of said magazine comprising a disc associated with and operative in unison with said cam means, said disc having a series of depressions, an arm having a projection adapted to seat in said depressions, said arm being pivotally mounted and having spring means for yieldingly maintaining said lateral projection in engagement with said depressions, spring means for effecting return movement of the magazine from its extreme advanced position to initial position, and means for preventing the operation of the phonograph in the event of failure of said disk to turn sufficiently to permit said arm projection to engage one of said depressions.

14. In an automatic phonograph, the combination of a magazine for holding a plurality of records, a turntable, means for transferring records from said magazine to said turntable, said magazine being movably mounted so as to permit positioning of the respective records carried thereby in operative relation to said transferring means, a cam for advancing said magazine step by step, pawl and ratchet means for advancing said cam step by step, a motor for driving said pawl and ratchet means to effect advancement of said magazine automatically, means adapted to be manually actuated for advancing said magazine, a normally disengaged clutch for connecting said manually operable means to said cam and a motor control actuated by said clutch for preventing operation of the motor when said manually operable means is being operated.

FOLKE A. BRANDSTROM.